US008544065B2

(12) United States Patent
Archer et al.

(10) Patent No.: US 8,544,065 B2
(45) Date of Patent: Sep. 24, 2013

(54) DATASPACE PROTECTION UTILIZING VIRTUAL PRIVATE NETWORKS ON A MULTI-NODE COMPUTER SYSTEM

(75) Inventors: Charles Jens Archer, Rochester, MN (US); Amanda Peters, Rochester, MN (US); Gary Ross Ricard, Chatfield, MN (US); Albert Sidelnik, Urbana, IL (US); Brian Edward Smith, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1164 days.

(21) Appl. No.: 12/018,237

(22) Filed: Jan. 23, 2008

(65) Prior Publication Data
US 2009/0187984 A1 Jul. 23, 2009

(51) Int. Cl.
*H04L 29/06* (2006.01)
(52) U.S. Cl.
USPC .................................................. 726/4; 726/15
(58) Field of Classification Search
USPC ...................... 370/474; 709/249; 726/4, 15
See application file for complete search history.

(56) References Cited

U.S. PATENT DOCUMENTS

| 5,768,271 A * | 6/1998 | Seid et al. ..................... 370/389 |
| 2002/0184345 A1 | 12/2002 | Masuyama et al. |
| 2004/0103218 A1* | 5/2004 | Blumrich et al. ............. 709/249 |
| 2004/0252722 A1* | 12/2004 | Wybenga et al. ............. 370/474 |

* cited by examiner

*Primary Examiner* — Jeffrey Pwu
*Assistant Examiner* — Thong Truong
(74) *Attorney, Agent, or Firm* — Martin & Associates, LLC; Bret J. Petersen

(57) ABSTRACT

A method and apparatus provide data security on a parallel computer system using virtual private networks. An access setup mechanism sets up access control data in the nodes that describes which virtual networks are protected and what applications have access to the protected private networks. When an application accesses data on a protected virtual network, a network access mechanism determines the data is protected and intercepts the data access. The network access mechanism in the kernel may also execute a rule depending on the kind of access that was attempted to the virtual network. Authorized access to the private networks can be made via a system call to the access control mechanism in the kernel. The access control mechanism enforces policy decisions on which data can be distributed through the system via an access control list or other security policies.

14 Claims, 6 Drawing Sheets

DATASPACE PROTECTION UTILIZING VIRTUAL PRIVATE NETWORKS ON A MULTI-NODE COMPUTER SYSTEM

BACKGROUND

1. Technical Field

The disclosure and claims herein generally relate to multi-node computer systems, and more specifically relate to data space protection using virtual private networks on a multi-node computer system.

2. Background Art

Supercomputers and other multi-node computer systems continue to be developed to tackle sophisticated computing jobs. One type of multi-node computer system is a massively parallel computer system. A family of such massively parallel computers is being developed by International Business Machines Corporation (IBM) under the name Blue Gene. The Blue Gene/L system is a high density, scalable system in which the current maximum number of compute nodes is 65,536. The Blue Gene/L node consists of a single ASIC (application specific integrated circuit) with 2 CPUs and memory. The full computer is housed in 64 racks or cabinets with 32 node boards in each rack.

Computer systems such as Blue Gene have a large number of nodes, each with its own processor and local memory. The nodes are connected with several communication networks. One communication network connects the nodes in a logical tree network. In the logical tree network, the Nodes are connected to an input-output (I/O) node at the top of the tree. In Blue Gene, there are 2 compute nodes per node card with 2 processors each. A node board holds 16 node cards and each rack holds 32 node boards. A node board has slots to hold 2 I/O cards that each have 2 I/O nodes. The nodes on two node boards can be configured in a virtual tree network that communicate with the I/O nodes.

Multi-node computer systems such as Blue Gene support the possibility of an in memory database. An in memory database is one where some portion of the database, or the entire database resides completely in memory rather than in bulk storage. An in memory database could provide an extremely fast response time for searches or queries of the database. A concern of all computer systems is data security. Some prior art data security techniques may not be effective or readily implemented on a parallel computer system, and in particular one with an in memory database.

Without an efficient way to provide data security, multi-node computer systems will continue to suffer from reduced data security and reduced efficiency of the computer system.

BRIEF SUMMARY

An apparatus and method is described for providing data security on a parallel computer system using virtual private networks connecting the nodes of the system. An access setup mechanism sets up access control data in the nodes that describes which virtual networks are protected and what applications have access to the protected private networks. This allows queries, data transfer, or data migration throughout the system for public data. When an application accesses data on a protected virtual network, a network access mechanism determines the data is protected and intercepts the data access. The network access mechanism in the kernel may also execute a rule depending on the kind of access that was attempted to the virtual network. For example, if a data query by an application was attempted on a private network, the kernel may kill the application or return an error code to the application. In the illustrated example, the access control mechanism provides access to protected data through system calls. Only authorized access is allowed on a protected network. Authorized access to the private networks can be made via a system call to the access control mechanism in the system kernel. The access control mechanism enforces policy decisions on which data can be distributed through the system via an access control list or other security policies.

The description and examples herein are directed to a massively parallel computer system such as the Blue Gene architecture, but the claims herein expressly extend to other parallel computer systems with multiple processors arranged in a network structure.

The foregoing and other features and advantages will be apparent from the following more particular description, and as illustrated in the accompanying drawings.

BRIEF DESCRIPTION OF DRAWINGS

The disclosure will be described in conjunction with the appended drawings, where like designations denote like elements, and.

DETAILED DESCRIPTION

The description and claims herein are directed to a method and apparatus for providing data security on a parallel computer system using virtual private networks connecting the nodes of the system. An access setup mechanism sets up access control data in the nodes that describes which virtual networks are private and what applications have access to the protected private networks. Public or open data can be accessed over the network by any node. This allows queries, data transfer, or data migration throughout the system for public data. When an application accesses data on a virtual private network, a network access mechanism determines the data is protected and intercepts the data access. The network access mechanism in the kernel may also execute a rule depending on the kind of access that was attempted to the virtual network. For example, if a data query by an application was attempted on a private network, the kernel may kill the application or return an error code to the application.

In the illustrated example below, the access control mechanism provides access to protected data on protected nodes. Only authorized access is allowed on a virtual private network of compute nodes. Authorized access to the private networks can be made via a system call to the access control mechanism in the kernel. The access control mechanism enforces policy decisions on which data can be distributed through the system via an access control list (or other security policies). The examples herein will be described with respect to the Blue Gene/L massively parallel computer developed by International Business Machines Corporation (IBM).

Figure 1:
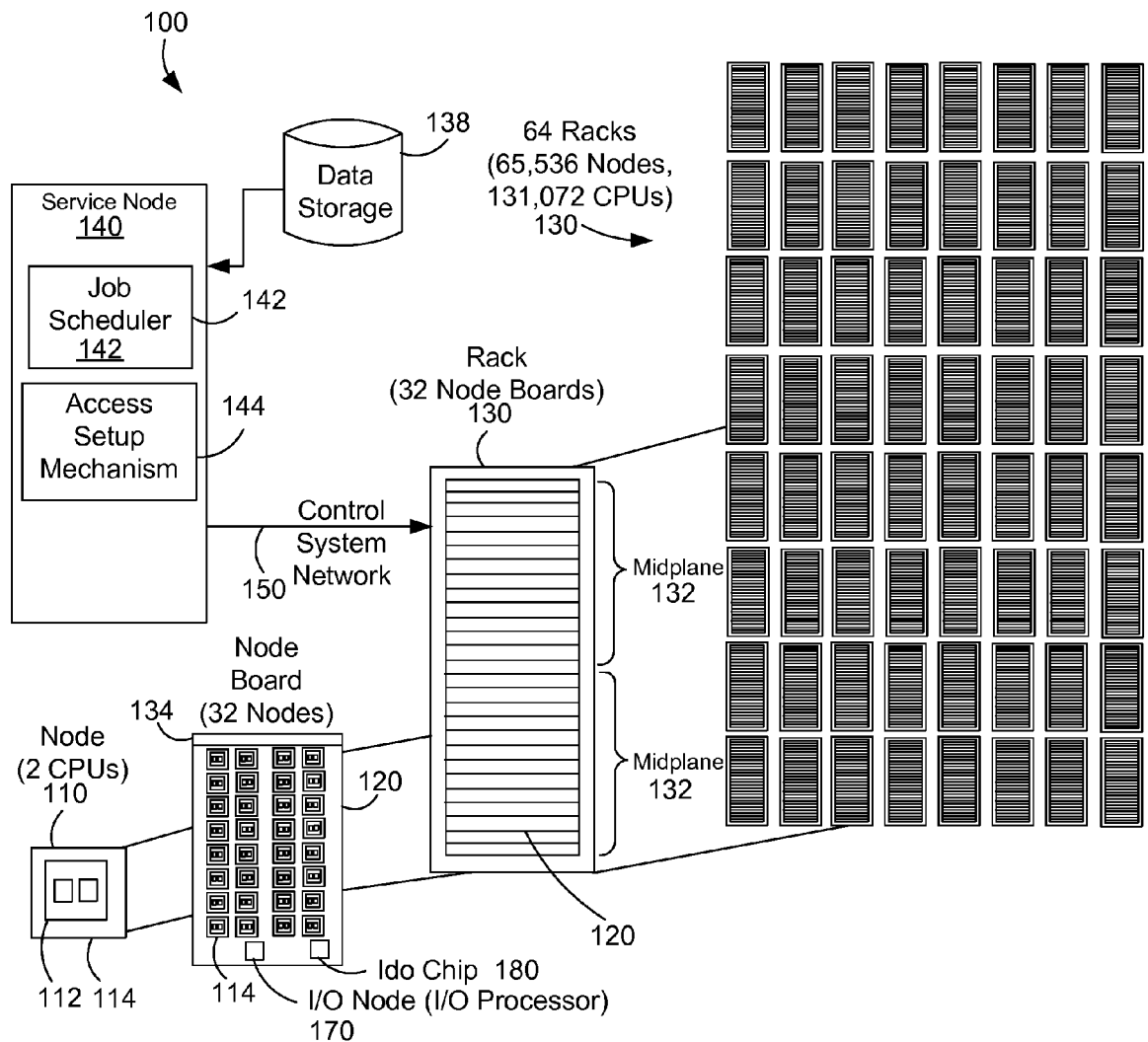
FIG. 1 is a block diagram of a massively parallel computer system.

FIG. 1 shows a block diagram that represents a massively parallel computer system 100 such as the Blue Gene/L computer system. The Blue Gene/L system is a scalable system in which the maximum number of compute nodes is 65,536. Each node 110 has an application specific integrated circuit (ASIC) 112, also called a Blue Gene/L compute chip 112. The compute chip incorporates two processors or central processor units (CPUs) and is mounted on a node daughter card 114. The node also typically has 512 megabytes of local memory (not shown). A node board 120 accommodates 32 node daughter cards 114 each having a node 110. Thus, each node board has 32 nodes, with 2 processors for each node, and the associated memory for each processor. A rack 130 is a housing that contains 32 node boards 120. Each of the node boards 120 connect into a midplane printed circuit board 132 with a midplane connector 134. The midplane 132 is inside the rack and not shown in FIG. 1. The full Blue Gene/L computer system would be housed in 64 racks 130 or cabinets with 32 node boards 120 in each. The full system would then have 65,536 nodes and 131, CPUs (64 racks×32 node boards×32 nodes×2 CPUs).

The Blue Gene/L computer system structure can be described as a compute node core with an I/O node surface, where each I/O node has an I/O processor connected to the service node 140. The I/O nodes 170 have no local storage. The I/O nodes are connected to the compute nodes through the logical tree network and also have functional wide area network capabilities through a gigabit ethernet network (See FIG. 2 below). The gigabit Ethernet network is connected to an I/O processor (or Blue Gene/L link chip) in the I/O node 170 located on a node board 120 that handles communication from the service node 160 to a number of nodes. The Blue Gene/L system has one or more I/O nodes 170 connected to the node board 120. The I/O processors can be configured to communicate with 8, 32 or 64 nodes. The service node uses the gigabit network to control connectivity by communicating to link cards on the compute nodes. The connections to the I/O nodes are similar to the connections to the compute node except the I/O nodes are not connected to the torus network.

Again referring to FIG. 1, the computer system 100 includes a service node 140 that handles the loading of the nodes with software and controls the operation of the whole system. The service node 140 is typically a mini computer system such as an IBM pSeries server running Linux with a control console (not shown). The service node 140 is connected to the racks 130 of compute nodes 110 with a control system network 150. The control system network 150 provides control, test, and bring-up infrastructure for the Blue Gene/L system. The control system network 150 includes various network interfaces that provide the necessary communication for the massively parallel computer system. The network interfaces are described further below.

The service node 140 communicates through the control system network 150 dedicated to system management. The control system network 150 includes a private 100-Mb/s Ethernet connected to an Ido chip 180 located on a node board 120 that handles communication from the service node 160 to a number of nodes. This network is sometime referred to as the JTAG network since it communicates using the JTAG protocol. All control, test, and bring-up of the compute nodes 110 on the node board 120 is governed through the JTAG port communicating with the service node.

The service node includes a job scheduler 142 for allocating and scheduling work processes and data placement on the compute nodes. The service node further includes an access setup mechanism 144 that sets up access control data (described below with reference to FIG. 2) to setup the virtual channels and what applications have access to data on private network channels.

Figure 2:
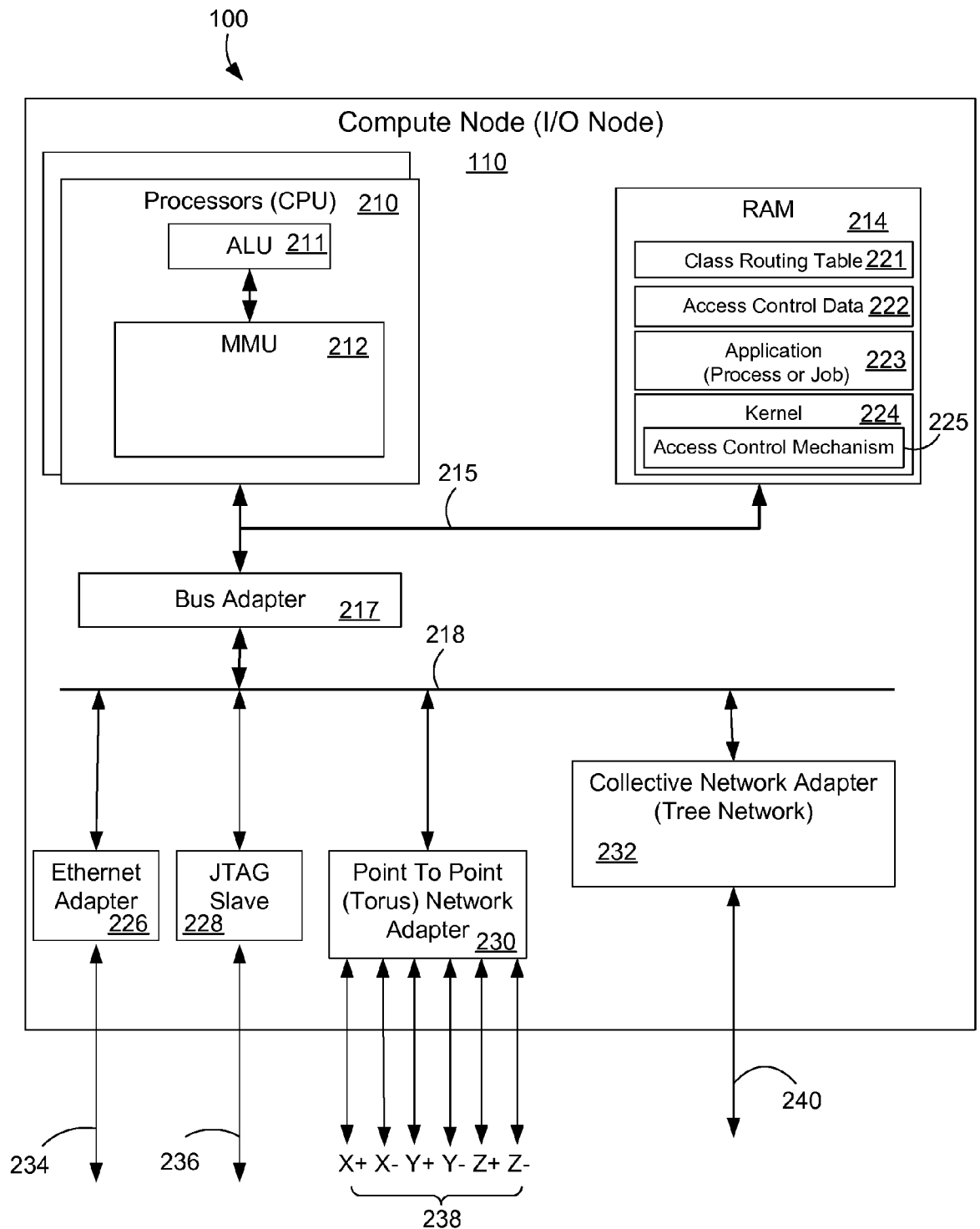
FIG. 2 is a block diagram of a compute node in a massively parallel computer system.

FIG. 2 illustrates a block diagram of an exemplary compute node as introduced above. FIG. 2 also represents a block diagram for an I/O node, which has the same overall structure as the compute node. A notable difference between the compute node and the I/O nodes is that the Ethernet adapter 226 is connected to the control system on the I/O node but is not used in the compute node. The compute node 110 of FIG. 2 includes a plurality of computer processors 210, each with an arithmetic logic unit (ALU) 211 and a memory management unit (MMU) 212. The processors 210 are connected to random access memory ('RAM') 214 through a high-speed memory bus 215. Also connected to the high-speed memory bus 214 is a bus adapter 217. The bus adapter 217 connects to an extension bus 218 that connects to other components of the compute node.

Again referring to FIG. 2, stored in RAM 214 is a class routing table 221, access control data 222, an application 223 and an operating system kernel 224 with an access control mechanism 225 described below. The class routing table 221 stores data for routing data packets on the collective network or tree network as described more fully below. The access control data 222 is information that is used by the access control mechanism to control access to private data as described below. The application 223 is a user software application, process or job that is loaded on the node by the control system to perform a designated task. The application program typically runs in a parallel with application programs running on adjacent nodes. The operating system kernel 224 is a module of computer program instructions and routines for an application program's access to other resources of the compute node. The quantity and complexity of tasks to be performed by an operating system on a compute node in a massively parallel computer are typically smaller and less complex than those of an operating system on a typical stand alone computer. The operating system may therefore be quite lightweight by comparison with operating systems of general purpose computers, a pared down version as it were, or an operating system developed specifically for operations on a particular massively parallel computer. Operating systems that may usefully be improved, simplified, for use in a compute node include UNIX, Linux, Microsoft XP, AIX, IBM's i5/OS, and others as will occur to those of skill in the art.

The compute node 110 of FIG. 2 includes several communications adapters 226, 228, 230, 232 for implementing data communications with other nodes of a massively parallel computer. Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network.

The data communications adapters in the example of FIG. 2 include a Gigabit Ethernet adapter 226 that couples example I/O node 110 for data communications to a Gigabit Ethernet 234. In Blue Gene, this communication link is only used on I/O nodes and is not connected on the compute nodes. Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 2 include a JTAG Slave circuit 228 that couples the compute node 110 for data communications to a JTAG Master circuit over a JTAG network 236. JTAG is the usual name used for the IEEE 1149.1 standard entitled Standard Test Access Port and Boundary-Scan Architecture for test access ports used for testing printed circuit boards using boundary scan. JTAG boundary scans through JTAG Slave 228 may efficiently configure processor registers and memory in compute node 110.

The data communications adapters in the example of FIG. 2 include a Point To Point Network Adapter 230 that couples the compute node 110 for data communications to a network 238. In Blue Gene, the Point To Point Network is typically configured as a three-dimensional torus or mesh. Point To Point Adapter 230 provides data communications in six directions on three communications axes, x, y, and z, through six bidirectional links 238: +x, −x, +y, −y, +z, and −z. The torus network logically connects the compute nodes in a lattice like structure that allows each compute node 110 to communicate with its closest 6 neighbors.

The data communications adapters in the example of FIG. 2 include a collective network or tree network adapter 232 that couples the compute node 110 for data communications to a network 240 configured as a binary tree. This network is also sometimes referred to as the collective network. Collective network adapter 232 provides data communications through three bidirectional links: two links to children nodes and one link to a parent node (not shown). The collective network adapter 232 of each node has additional hardware to support operations on the collective network.

Again referring to FIG. 2, the collective network 240 extends over the compute nodes of the entire Blue Gene machine, allowing data to be sent from any node to all others (broadcast), or a subset of nodes. Each node typically has three links, with one or two links to a child node and a third connected to a parent node. Arithmetic and logical hardware is built into the collective network to support integer reduction operations including min, max, sum, bitwise logical OR, bitwise logical AND, and bitwise logical XOR. The collective network is also used for global broadcast of data, rather than transmitting it around in rings on the torus network. For one-to-all communications, this is a tremendous improvement from a software point of view over the nearest-neighbor 3D torus network.

Figure 3:
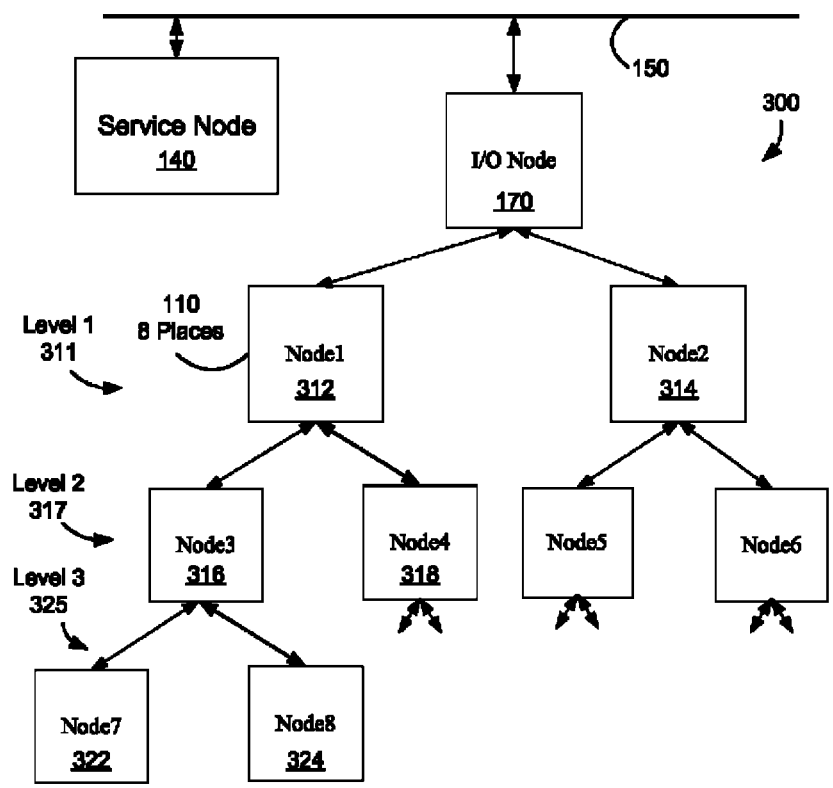
FIG. 3 shows a block diagram of compute nodes arranged in a virtual tree network.

FIG. 3 illustrates a portion of the collective network or tree network shown as 240 in FIG. 2. The collective or tree network 300 is connected to the service node 140 through the control system network 150. The tree network 300 is a group of compute nodes 110 connected an I/O node 170 in a logical tree structure. The I/O node 170 is connected to one or more compute nodes 110. Each of the compute nodes Node1 312, and Node2 314 are connected directly to the I/O node 170 and form the top of the tree or a first level 311 for a set of nodes connected below each of Node1 312 and Node2 314. Node1 312 is the top of a tree network and has child nodes Node3 316 and Node4 318 on a second level 317. Similarly, Node3 316 has child nodes Node7 322 and Node8 324 on a third level 325. Many of the child nodes are not shown for simplicity, but the tree network 300 could contain any number of nodes with any number of levels.

A user partition is a group of nodes that is formed to execute a user application. When a user partition is formed, an independent collective network is formed for the partition; it includes all nodes in the partition (and no nodes in any other partition). In the collective network, each node contains a class routing table that is used in conjunction with a small header field in each packet of data sent over the network to determine a class. The class is used to locally determine the routing of the packet. With this technique, multiple independent collective networks called virtual channels are virtualized in a single physical network with one or more I/O nodes for the virtual network. Two standard examples of this are the class that connects a small group of compute nodes to an I/O node and a class that includes all the compute nodes in the system.

Figure 4:
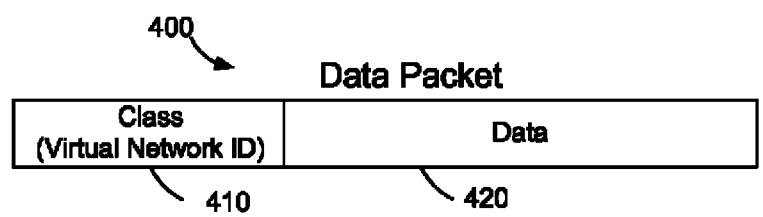
FIG. 4 shows a data packet for communicating on a virtual tree network in a massively parallel computer system.

FIG. 4 shows a data packet 400 for communicating on the tree network 240 (FIG. 2) in a massively parallel computer system 100 (FIG. 1). Each data packet 400 includes a class 410 and data 420. The class 410 is used to determine the routing of the packet to deliver data 420 on a virtual channel (described below) over the collective network (FIG. 2, 240). The class 410 is used in conjunction with the class routing table 221 to determine how to route the data packet 400 to the appropriate node on the tree network.

Figures 5, 6:
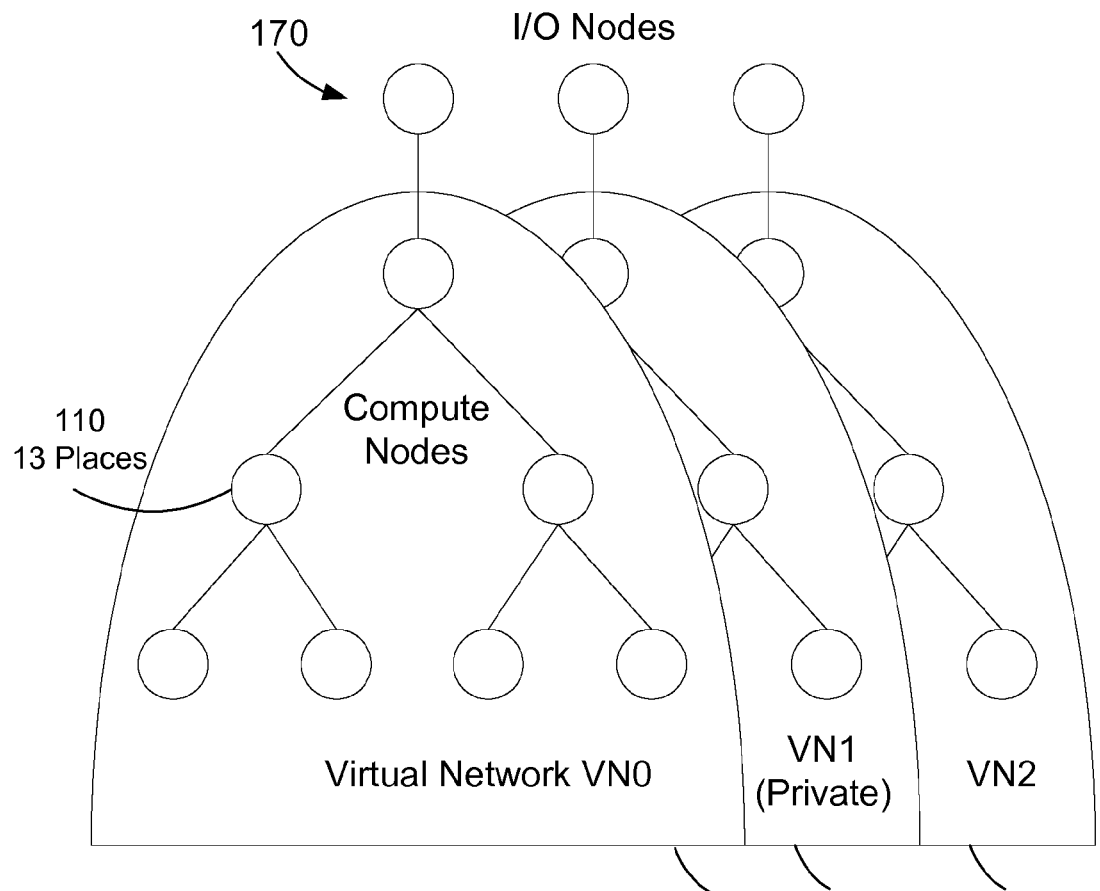
FIG. 5 shows three virtual tree networks with one of the virtual networks a protected network, or a virtual private network in a massively parallel computer system.
FIG. 6 is a table that represents access control data in a massively parallel computer system.

FIG. 5 represents a portion of the compute nodes 110 in a multi-node computer system. The compute nodes 110 are arranged in a number of virtual channels 510, 512, 514 or tree networks using the collective network described above. In this example, virtual channel 512 is designated as "private". This means access to the virtual channel is restricted to the kernel. The virtual channel 512 is setup as a private channel by the access setup mechanism 144 as described herein.

FIG. 6 illustrates a table that represents access control data 222 in a multi-node computer system. The access control data 222 resides in the memory of the compute node 110 as described above with reference to FIG. 2. The access control data 222 includes data associated with each of the virtual networks created on the collective network. The access control data includes a class or virtual network ID 610, a private flag 612 and an availability list 614. In the illustrated example shown in FIG. 6, access control data is listed for the three virtual networks shown in FIG. 5. The access control data includes the virtual network ID's for the three networks, namely VN0 616, VN1 618, and VN2 620. In the example shown here, the private flag 622 has the value "No" which indicates the virtual network VN1 is not private. Since this virtual network is not private, the availability list 624 indicates the network is available to "All" applications or processes. The table may contain any suitable data to indicate the network is available to all applications. Further, the private flag 628 has the value "Yes" which indicates the virtual network VN1 is private. Since this virtual network is private, the availability list 630 contains process or application IDs for those processes or applications that have authorized access to the corresponding virtual private network. The process or application IDs are some type of identifier for processes and applications executing on the multi-node computer system. Alternatively, the applications list 630 may be a link to a suitable data structure containing a list of processes or applications that are authorized to access data on the virtual private network.

Figure 7:
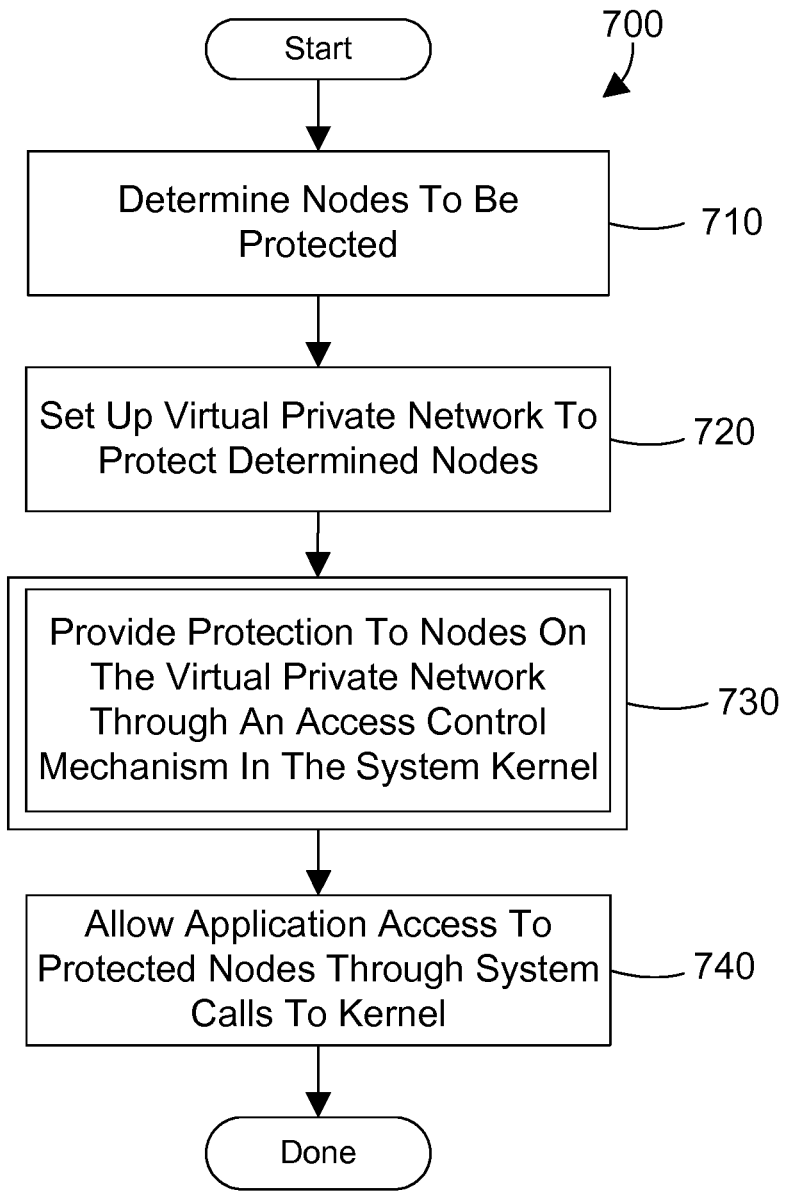
FIG. 7 is a method flow diagram of a method for data security on a parallel computer system using virtual private networks on a massively parallel computer system.

FIG. 7 shows a method 700 for providing data space protection a on multi-node computer system using virtual private networks. The steps in method 700 are preferably performed by an access setup mechanism 144 in the service node 140 (FIG. 1) and the access control mechanism 222 (FIG. 2) in the compute node 110. The first step is to determine what nodes are to be protected (step 710). Determining protected nodes could be done by a systems administrator or by an application startup procedure that requests a group of protected nodes for protected data space. The next step is to set up the virtual private network to protect the determined nodes (step 720). Next, provide protection to the nodes in the virtual private network through an access control mechanism in the system kernel operating on the nodes (step 730). Then allow application access to protected nodes in the virtual private network through system calls to the kernel (step 740). The method is then done.

Figure 8:
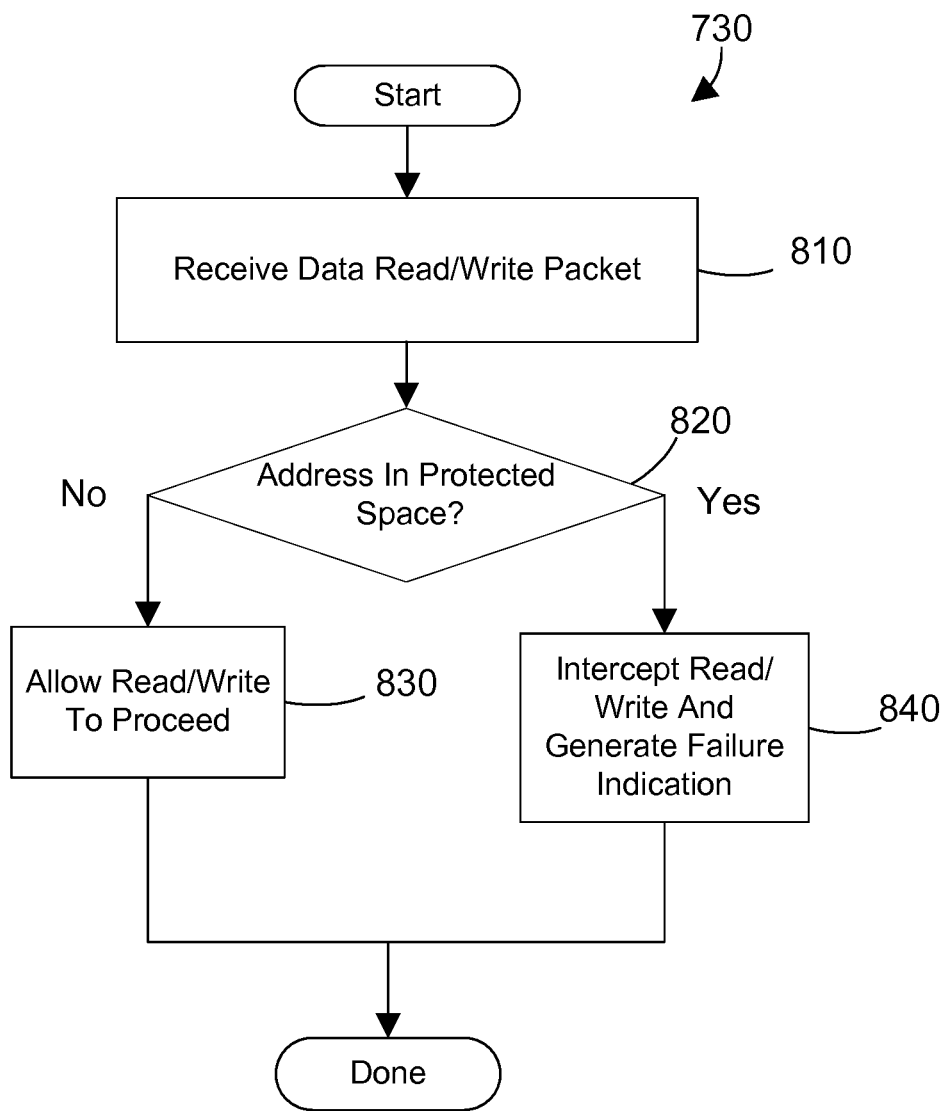
FIG. 8 is a method flow diagram that illustrates one possible implementation of step 730 in FIG. 7.

FIG. 8 shows a method 730 for providing protection to nodes on a virtual private network through an access control mechanism in the kernel on a massively parallel computer system. Method 730 is an exemplary implementation of step 730 in method 700. The steps in method 730 are preferably performed by the access control mechanism 222 (FIG. 2) in the compute node 110. In Blue Gene, a memory access to the collective network is accomplished by a message processing interface (MPI) library constructing a packet with the header having the proper class route information to the end location. The packet is then copied to a tree memory address for broadcast on the network. Method 730 is the operation of the access control mechanism to monitor this tree memory address for unauthorized access to a protected virtual private network. The access control mechanism first receives the read/write packet (step 810). If the read/write packet has an address that is not in a protected memory space (in a virtual private network) (step 820=no) then the access control mechanism will allow the read/write to proceed (step 830). The method is then done. If the read/write packet has an address that is in a protected memory space (in a virtual private network) (step 820=yes) then the access control mechanism will intercept the read/write and generate a failure indication (step 840). The method is then done.

An apparatus and method is described herein to provide data security on a parallel computer system using virtual networks connecting the nodes of the system. A network access mechanism determine when data on a protected virtual network is accessed and intercepts the data access to efficiently provide data space security on a multi-node computer system.

One skilled in the art will appreciate that many variations are possible within the scope of the claims. Thus, while the disclosure has been particularly shown and described above, it will be understood by those skilled in the art that these and other changes in form and details may be made therein without departing from the spirit and scope of the claims.

What is claimed is:

1. A multi-node computer system comprising:
a plurality of compute nodes that each comprise a processor and memory connected by a plurality of virtual networks;
an access setup mechanism that configures access control data on the compute nodes to indicate at least one of the plurality of virtual networks is a virtual private network wherein the access control data comprises the following for each virtual private network: class identification (ID), private flag that indicates the class ID is private, and an availability list that lists applications that are authorized to access the virtual private network;
an access control mechanism located in a system kernel of the compute node that provides data protection to nodes on the virtual private network;
wherein the access control mechanism provides data protection by allowing access to authorized applications based on the access control data through a system call to the system kernel to control access to data in a memory on the plurality of compute nodes over the plurality of virtual networks, and
wherein the access control mechanism further provides data protection by intercepting data access for an application that is not authorized to access data on a virtual private network based on the access control data.

2. The multi-node computer system of claim 1 wherein the multi-node computer system is a massively parallel computer system.

3. The multi-node computer system of claim 1 wherein the access setup mechanism configures a class routing table to set up the plurality of virtual networks.

4. The multi-node computer system of claim 1 wherein the access control mechanism intercepts read/write operations for an application that is not authorized to access data on a virtual private network and generates a failure indication.

5. The multi-node computer system of claim 1 wherein the plurality of compute nodes are arranged in a virtual tree network and further comprising an I/O node that connects to the top of the tree network to allow the compute nodes to communicate with a service node of a massively parallel computer system.

6. A computer implemented method for data security using virtual networks in a multi-node computer system, the method comprising the steps of:
determining nodes to be protected;
setting up a virtual private network to make the determined nodes become protected nodes by configuring access control data on the compute nodes to indicate one of a plurality of virtual networks is a virtual private network;
providing data protection to nodes on the virtual private network through an access control mechanism, wherein data protection is provided based on the access control data in a system kernel in the nodes, wherein the access control data comprises the following for each virtual private network: class identification (ID), private flag that indicates the class ID is private, and an availability list that lists applications that are authorized to access the virtual private network; and
allowing one or more authorized applications to access a protected node based on the access control data through a system call to the access control mechanism in the system kernel.

7. The computer implemented method of claim 6 wherein the multi-node computer system is a massively parallel computer system.

8. The computer implemented method of claim 6 wherein the step of setting up the virtual private network includes configuring a class routing table to set up the plurality of virtual networks.

9. The computer implemented method of claim 6 wherein the access control mechanism intercepts read/write operations for an application that is not authorized to access data on the virtual private network and generates a failure indication.

10. A computer implemented method for data security using virtual networks in a multi-node computer system, the method comprising the steps of:
determining nodes to be protected in a massively parallel computer system;
setting up a virtual private network to make the determined nodes become protected nodes by configuring a class routing table to set up a plurality of virtual networks, and by configuring access control data on the compute nodes to indicate one of the plurality of virtual networks is a virtual private network;
providing data protection to nodes on the virtual private network through an access control mechanism, wherein data protection is provided based on the access control data in a system kernel in the nodes by intercepting read/write operations for an application that is not authorized to access data on a virtual private network and generating a failure indication, wherein the access control data comprises the following for each virtual private network: class identification (ID), private flag that indicates the class ID is private, and an availability list that lists applications that are authorized to access the virtual private network; and allowing one or more authorized applications to access a protected node based on the access control data through a system call to the access control mechanism in the system kernel.

11. A computer-readable article of manufacture comprising:

an access setup mechanism that configures access control data on a plurality of compute nodes connected with a plurality of virtual networks, where the access control data indicates a virtual network is a virtual private network and what applications have access to the virtual private network;

an access control mechanism that controls access to data in a memory on the plurality of compute nodes over the plurality of virtual networks based on the access control data to provide data protection to the nodes, wherein the access control mechanism located in a system kernel of the compute node provides data protection by allowing access to authorized applications based on the access control data through a system call to the system kernel, wherein the access control mechanism further provides data protection by intercepting data access for an application that is not authorized to access data on a virtual private network based on the access control data;

wherein the access control data comprises the following for each virtual private network: class identification (ID), private flag that indicates the class ID is private, and an availability list that lists applications that are authorized to access the private virtual network; and non-transitory computer recordable media bearing the access setup mechanism and the access control mechanism.

12. The article of manufacture of claim 11 wherein the access setup mechanism configures a class routing table to set up the plurality of virtual networks.

13. The article of manufacture of claim 11 wherein the access control mechanism intercepts read/write operations for an application that is not authorized to access data on a virtual private network and generates a failure indication.

14. The article of manufacture of claim 11 wherein the plurality of compute nodes are arranged in a virtual tree network and further comprising an I/O node that connects to the top of the tree network to allow the compute nodes to communicate with a service node of a massively parallel computer system.

* * * * *